(12) United States Patent
Marshall

(10) Patent No.: US 7,789,027 B1
(45) Date of Patent: Sep. 7, 2010

(54) SOIL TREATMENT DEVICE

(76) Inventor: Billy D. Marshall, 144 Martin La., Bismarck, AR (US) 71929

( * ) Notice: Subject to any disclaimer, the term of this patent is extended or adjusted under 35 U.S.C. 154(b) by 387 days.

(21) Appl. No.: 11/871,435

(22) Filed: Oct. 12, 2007

(51) Int. Cl.
*A01B 77/00* (2006.01)
*A01C 5/00* (2006.01)
*A01C 7/08* (2006.01)
*A01C 15/00* (2006.01)
*A01C 17/00* (2006.01)

(52) U.S. Cl. .................. 111/130; 111/156; 111/200; 47/1.42; 47/58.1 SC; 47/905; 47/DIG. 10

(58) Field of Classification Search .............. 47/58.1 R, 47/58.1 LS, 58.1 SC, 905, 1.01 R, 1.42, DIG. 8–DIG. 12; 180/7.1, 9–9.64, 10, 311–313, 337–385, 180/900, 905–907; 111/200, 900, 921, 922, 111/130, 156
See application file for complete search history.

(56) References Cited

U.S. PATENT DOCUMENTS

| | | | |
|---|---|---|---|
| 4,496,015 A * | 1/1985 | Porter et al. | 180/9.26 |
| 4,873,789 A | 10/1989 | Plattner | |
| 5,141,059 A | 8/1992 | Marsh | |
| 5,209,604 A | 5/1993 | Chou | |
| 5,836,718 A | 11/1998 | Price | |
| 6,044,921 A * | 4/2000 | Lansberry | 180/9.36 |
| 6,682,697 B2 | 1/2004 | He et al. | |
| 6,749,848 B2 | 6/2004 | Chen | |
| 2003/0215354 A1 | 11/2003 | Clark et al. | |
| 2006/0186115 A1 | 8/2006 | Joines et al. | |
| 2007/0270263 A1 * | 11/2007 | Gotz et al. | 475/5 |

* cited by examiner

*Primary Examiner*—Christopher J. Novosad
(74) *Attorney, Agent, or Firm*—Crossley Patent Law; Mark A. Crossley

(57) ABSTRACT

A soil treatment device that reconditions topsoil by removing an amount of topsoil, treating the topsoil, placing bacteria and small organisms within the topsoil, and then returning the topsoil to the ground surface. The device removes the topsoil from a ground surface by a front-mounted set of cutter blades that remove topsoil down to a specific depth and places it on a conveyer belt. The belt then transports the topsoil into the device, where it is irradiated; seeded with bacteria, microorganisms, and seedlings; and then discharged back onto the ground surface.

13 Claims, 3 Drawing Sheets

SOIL TREATMENT DEVICE

BACKGROUND OF THE INVENTION

The present invention concerns that of a new and improved soil treatment device that provides a comprehensive means of reconditioning topsoil by removing an amount of topsoil, treating the topsoil, placing bacteria and small organisms within the topsoil, and then returning the topsoil to the ground surface.

SUMMARY OF THE INVENTION

The present invention concerns that of a new and improved soil treatment device that provides a comprehensive means of reconditioning topsoil by removing an amount of topsoil, treating the topsoil, placing bacteria and small organisms within the topsoil, and then returning the topsoil to the ground surface. The device removes the topsoil from a ground surface by a front-mounted set of cutter blades that remove topsoil down to a specific depth and places it on a conveyer belt. The belt then transports the topsoil into the device, where it is irradiated; seeded with bacteria, microorganisms, and seedlings; and then discharged back onto the ground surface.

There has thus been outlined, rather broadly, the more important features of a soil treatment device that the detailed description thereof that follows may be better understood and in order that the present contribution to the art may be better appreciated. There are, of course, additional features of the soil treatment device that will be described hereinafter and which will form the subject matter of the claims appended hereto.

In this respect, before explaining at least one embodiment of the soil treatment device in detail, it is to be understood that the soil treatment device is not limited in its application to the details of construction and to the arrangements of the components set forth in the following description or illustrated in the drawings. The soil treatment device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present soil treatment device. It is important, therefore, that the claims be regarded as including such equivalent constructions insofar as they do not depart from the spirit and scope of the present invention.

It is therefore an object of the present invention to provide a soil treatment device which has all of the advantages of the prior art and none of the disadvantages.

It is another object of the present invention to provide a soil treatment device which may be easily and efficiently manufactured and marketed.

It is another object of the present invention to provide a soil treatment device which is of durable and reliable construction.

It is yet another object of the present invention to provide a soil treatment device which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
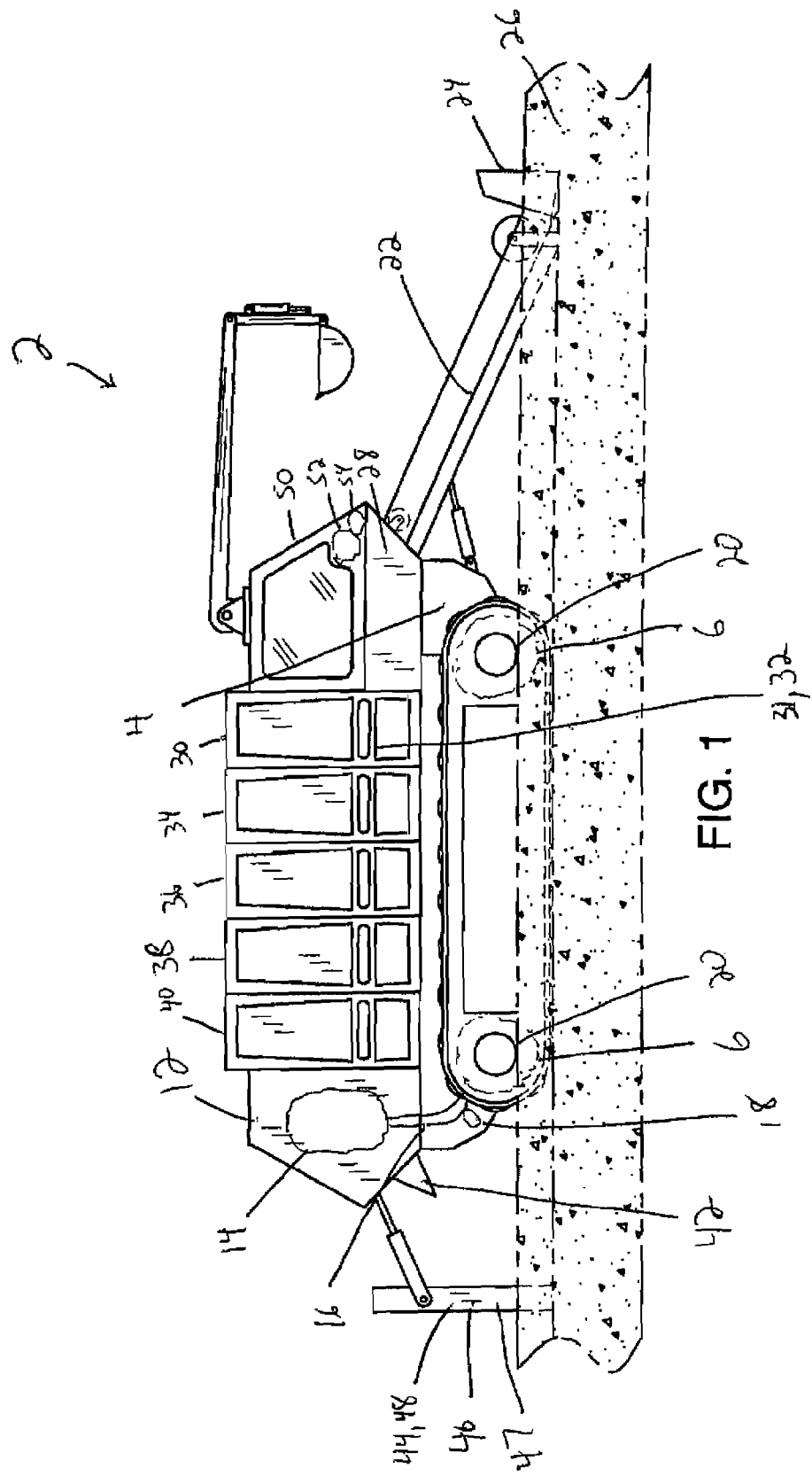
FIG. 1 shows a side view of the soil treatment device as it would appear in use.
Figure 2:
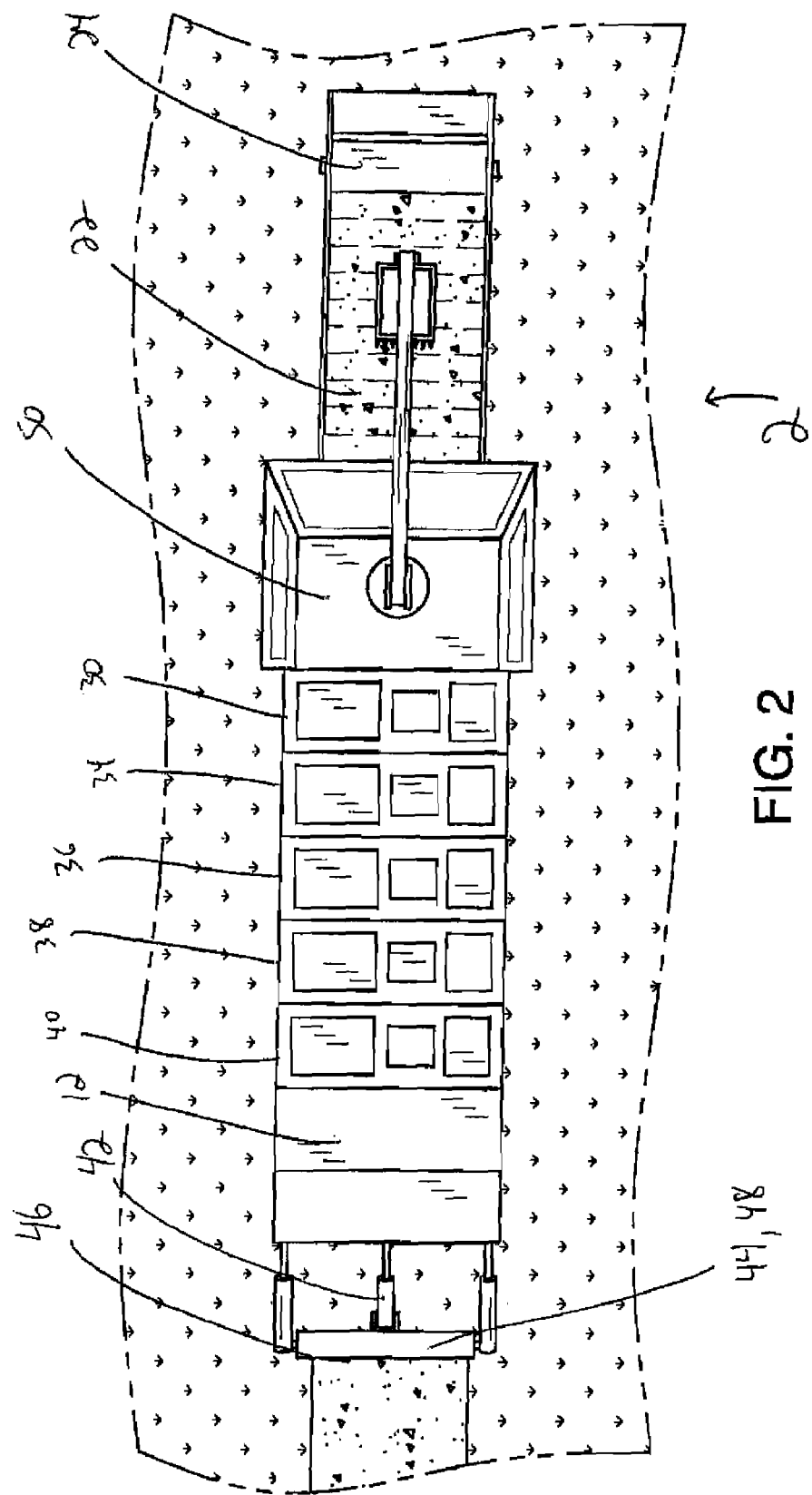
FIG. 2 shows a top view of the soil treatment device as it would appear in use.

With reference now to the drawings, and in particular to FIGS. 1 through 4 thereof, a new soil treatment device embodying the principles and concepts of the present invention and generally designated by the reference numeral 2 will be described.

As best illustrated in FIGS. 1 through 4, the soil treatment device 2 comprises a platform 4 that has two surfaces comprising an upper surface and a lower surface, and furthermore, has two ends comprising a front end and a rear end. Furthermore, the platform 4 has two sides comprising a left side and a right side.

The platform 4 is supported by a plurality of wheels 6 that are attached to the lower surface of the platform 4 near both the left side and the right side of the platform 4. A left tread 8 surrounds all of the wheels 6 attached to the left side of the platform 4, while the right tread 10 surrounds all of the wheels 6 attached to the right side of the platform 4.

An engine compartment 12 is attached to the upper surface of the platform 4 near the rear end of the platform 4. The engine compartment 12 houses an internal combustion engine 14 that is attached to a hydrostatic drive system 16. The engine 14, therefore, is connected to various motors 18 that are connected to the axles 20 supporting the wheels 6. The engine 14 drives the motors 18 to push the axles 20 in the desired direction of an operator of the soil treatment device 2. This, in turn, rotates the wheels, which causes the left tread 8 and right tread 10 to move.

Various components are attached to the front end of the platform 4. A conveyer belt 22 is pivotally attached to the front end of the platform 4, with a plurality rotating cutting blades 24 being located in front of the conveyer belt 22. The cutting blades 24 are designed to be set to a depth of 18 inches below grade, allowing the cutting blades 24 to pull up a large amount of topsoil 26. While the cutting blades 24 grind up a layer of topsoil 26, it is also depositing this topsoil 26 on the conveyer belt 22. The conveyer belt 24, in turn, moves the topsoil 26 back towards the device 2.

As the topsoil 26 approaches the platform 4, it first enters an irradiation chamber 28 that is designed to sterilize the incoming topsoil 26. The irradiation chamber 28 is preferably located on the upper surface of the platform 4 near the front end of the platform 4. After the topsoil 26 leaves the irradiation chamber 28, it is designed to pass through a series of successive bins so that it can be properly processed.

After the irradiation chamber 28, the topsoil 26 then enters in a soil analyzer bin 30, which includes a number of soil analyzers 31. The soil analyzer bin 30 is also located on the upper surface of the platform and includes a microprocessor 32 that analyzes various attributes and variables within the topsoil 26. The microprocessor 32 is connected to the successive bins and helps monitor and vary the treatment the topsoil 26 itself receives in these various successive bins based on the readings within the soil analyzer bin 30.

Additional bins that are utilized within the device 2 are a lime bin 34, a mulch bin 36, a germination bin 38, and a microorganism bin 40. All of these bins are located on the top surface of the platform 4. The lime bin 34 adds an amount of lime to the topsoil 26, if necessary. The mulch bin 36 adds an amount of mulch to the topsoil 26, if necessary. The germination bin 38 adds various seeds to the topsoil 26 so that the topsoil 26 can sprout new plants once placed back on the ground surface, which helps the topsoil 26 develop more traction and adherence to the ground surface. Finally, the microorganism bin 40 is designed to add items such as bacteria, eggs, and larval stage organisms to the topsoil 26. By adding these items to the soil within the microorganism bin 40, one can create additional biodiversity within the topsoil 26 prior to it being placed back on the ground surface.

After the irradiation chamber 28 and the soil analyzer bin 30, there is no particular order in which the subsequent bins need to be placed. As long as the successive bins are tightly stacked against one another, the topsoil 26 passing through the device 2 will pass effortless from one bin to the next without having exposure to the outside air or other factors.

Once the topsoil 26 has passed through the last successive bin, it then enters the discharge chute 42 of the device 2, which is attached to the upper surface of the platform 4 near the rear end of the platform 4. After the topsoil 26 falls onto the ground surface, it is then seeded with seeds 44 that are being planted by a planter device 46 overhanging the rear end of the platform 4. The plantar device 46 has an internal supply of seeds 48 within it that are planted on a constant, ongoing basis into the just-deposited topsoil 26. Furthermore, the plantar device 46 has a plurality of cutter knives 47 that are dragged through the top soils, helping intermix the just-deposited topsoil 26 with the just-deposited seeds 48.

To operate the device 2, an individual can stay within a cab area 50 that is located atop the irradiation chamber 28 near the front end of the platform 4. The cab 50 has a series of controls 52 that allow an individual to operate the device 2, with these controls 52 being supported by a generator 54 that is powered by the engine 14.

Figure 4:
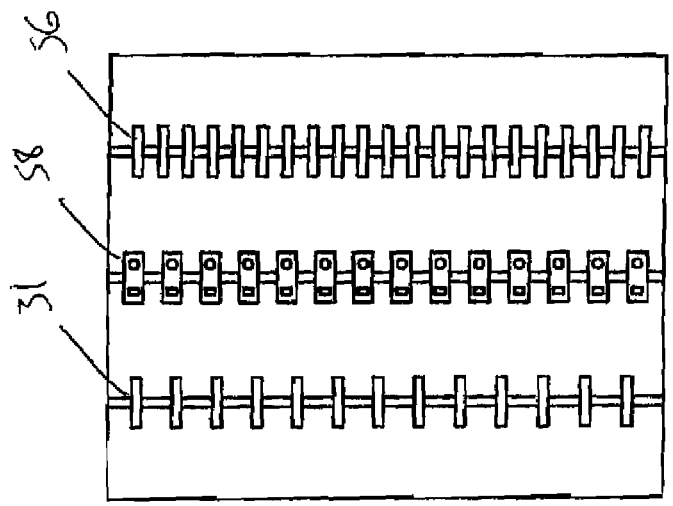
FIG. 4 shows a top view of the soil analyzing bin within the soil treatment device.
Figure 3:
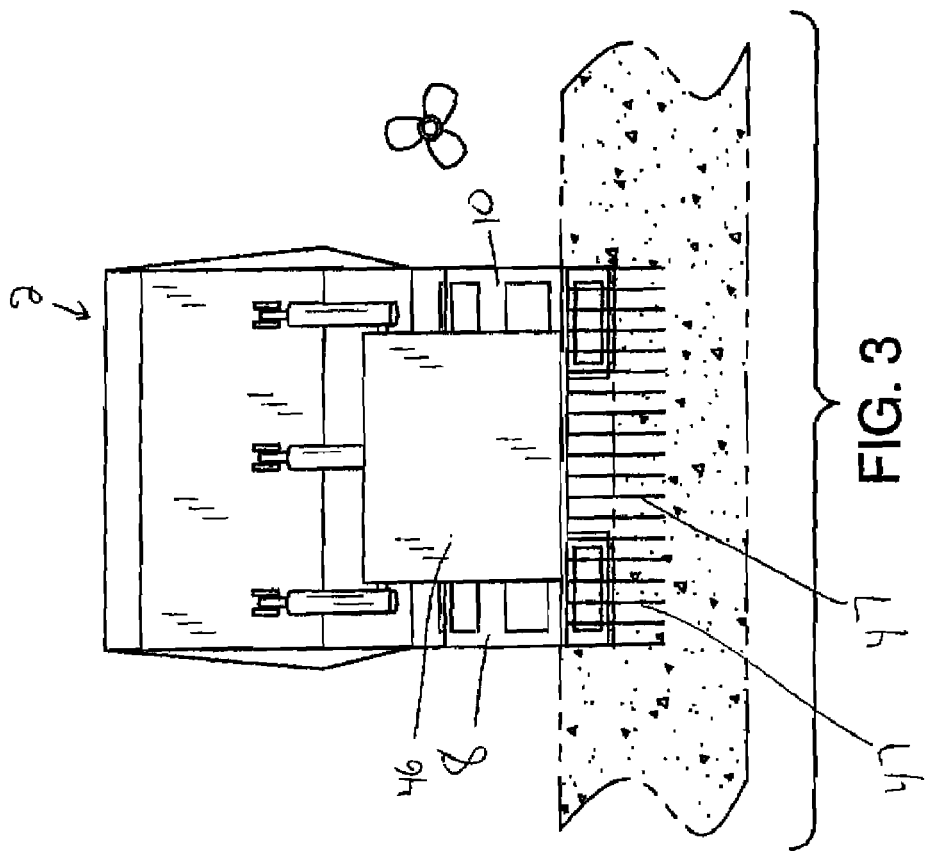
FIG. 3 shows a rear view of the soil treatment device as it would appear in use.

FIG. 4 shows a figurative representation of the topsoil 26 as it travels through the first few steps of the present invention. The topsoil 26, after traveling on the conveyer belt 22, passes through a series of disks 56. Then, it passes adjacent to a magnetron 58, which provides the necessary irradiation. Finally, the topsoil 26 passes through the soil analyzers 31 in the soil analyzer bin 30. Afterward, the topsoil 26 continues movement throughout the device 2 until it exits near the rear end of the platform 4.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A soil treatment device comprising
   a platform having two surfaces comprising an upper surface and a lower surface, the platform also having two ends comprising a front end and a rear end, the platform also having two sides comprising a left side and a right side,
   means for transporting the platform,
   means for treating soil that is passed through the soil treatment device,
   wherein the means for transporting the platform further comprises
      a plurality of wheels, wherein the wheels are attached to the lower surface of the platform proximal to both the left side and the right side of the platform,
      a pair of treads comprising a left tread and a right tread, wherein the left tread surrounds all of the wheels attached to the left side of the platform, and further wherein the right tread surrounds all of the wheels attached to the right side of the platform,
      a plurality of axles, the axles being connected to the wheels, the axles designed to support the wheels,
      an engine compartment attached to the upper surface of the platform near proximal to the rear end of the platform,
      an internal combustion engine located within the engine compartment,
      a hydrostatic drive system attached to the internal combustion engine,
      a plurality of motors, each of the motors being attached to the internal combustion engine,
      wherein each of the motors is attached to at least one axle of the plurality of axles, further wherein each of the motors drives the axle in a desired direction,
   wherein the means for treating soil that is passed through the soil treatment device further comprises
      a conveyer belt pivotally attached to the front end of the platform,
      a plurality of rotating cutter blades located in front of the conveyer belt,
      wherein the plurality of rotating cutter blades are designed to be positioned approximately eighteen (18) inches below grade, allowing the rotating cutter blades to pick up a large amount of soil.

2. A soil treatment device according to claim 1 wherein the means for treating soil that is passed through the soil treatment device further comprises
   (a) an irradiation chamber, the irradiation chamber being located on the upper surface of the platform proximal to the front end of the platform,
   (b) wherein soil passes through the irradiation chamber after the soil exits the conveyer belt.

3. A soil treatment device according to claim 2 wherein the means for treating soil that is passed through the soil treatment device further comprises
   (a) a soil analyzer bin, the soil analyzer bin being located on the upper surface of the platform proximal to the front end of the platform,
   (b) a plurality of soil analyzers located within the soil analyzer bin,
   (c) a microprocessor located within the soil analyzer bin,
   (d) wherein soil passes through the soil analyzer bin after it exits the conveyer belt,
   (d) further wherein the microprocessor analyzes various attributes and variables within the soil passing through the soil analyzer bin.

4. A soil treatment device according to claim 3 wherein the means for treating soil that is passed through the soil treatment device further comprises further comprises a plurality of treatment chambers for treating soil passing through the device.

5. A soil treatment device according to claim 4 wherein device further comprises
   (a) a discharge chute, the discharge chute being attached to the upper surface of the platform proximal to the rear end of the platform, wherein soil traveling through the soil treatment device will pass through the discharge chute and be deposited on a ground surface,
   (b) means for depositing seeds in the vicinity of the discharge chute, and
   (c) means for intermixing the just-deposited seeds with the just-deposited soil.

6. A soil treatment device according to claim 5 wherein the means for depositing seeds in the vicinity of the discharge chute further comprises
   (a) a plantar device overhanging the rear end of the platform,
   (b) an internal supply of seeds located within the plantar device,
   (c) wherein the plantar device, on an ongoing basis, deposits seeds into the just-deposited soil from the soil treatment device.

7. A soil treatment device according to claim 6 wherein the means for intermixing the just-deposited seeds with the just-deposited soil further comprises
   (a) a plurality of cutter knives attached to the plantar device,
   (b) wherein the plurality of cutter knives are dragged through the just-deposited soil on an ongoing basis.

8. A soil treatment device according to claim 7 wherein the plurality of treatment chambers for treating soil passing through the device further comprises
   (a) a lime bin located on the upper surface of the platform,
   (b) wherein the lime bin is designed to add an amount of lime to the soil.

9. A soil treatment device according to claim 8 wherein the plurality of treatment chambers for treating soil passing through the device further comprises
   (a) a mulch bin located on the upper surface of the platform,
   (b) wherein the mulch bin is designed to add an amount of mulch to the soil.

10. A soil treatment device according to claim 9 wherein the plurality of treatment chambers for treating soil passing through the device further comprises
    (a) a germination bin located on the upper surface of the platform,
    (b) wherein the germination bin is designed to add various seeds to the soil.

11. A soil treatment device according to claim 10 wherein the plurality of treatment chambers for treating soil passing through the device further comprises
    (a) a microorganism bin located on the upper surface of the platform,
    (b) wherein the microorganism bin is designed to add various microorganisms to the soil.

12. A soil treatment device according to claim 11 wherein the soil treatment device further comprises
    (a) a cab area located atop the irradiation chamber proximal to the front end of the platform,
    (b) a series of controls located within the cab area that allow an individual operate the soil treatment device, and
    (c) a generator to provide power to the series of controls, wherein the generator receives power from the internal combustion engine.

13. A soil treatment device comprising
    (a) a platform having two surfaces comprising an upper surface and a lower surface, the platform also having two ends comprising a front end and a rear end, the platform also having two sides comprising a left side and a right side,
    (b) means for transporting the platform, said means further comprising (i) a plurality of wheels, wherein the wheels are attached to the lower surface of the platform proximal to both the left side and the right side of the platform, (ii) a pair of treads comprising a left tread and a right tread, wherein the left tread surrounds all of the wheels attached to the left side of the platform, and further wherein the right tread surrounds all of the wheels attached to the right side of the platform, (iii) a plurality of axles, the axles being connected to the wheels, the axles designed to support the wheels, (iv) an engine compartment attached to the upper surface of the platform proximal to the rear end of the platform, (v) an internal combustion engine located within the engine compartment, (vi) a hydrostatic drive system attached to the internal combustion engine, (vii) a plurality of motors, each of the motors being attached to the internal combustion engine, (viii) wherein each of the motors is attached to at least one axle of the plurality of axles, further wherein each of the motors drives the axle in a desired direction, and
    (c) means for treating soil that is passed through the soil treatment device, said means further comprising (i) a conveyer belt pivotally attached to the front end of the platform, (ii) a plurality of rotating cutter blades located in front of the conveyer belt, (iii) wherein the plurality of rotating cutter blades are designed to be positioned approximately eighteen (18) inches below grade, allowing the rotating cutter blades to pick up a large amount of soil, (iv) an irradiation chamber, the irradiation chamber being located on the upper surface of the platform proximal to the front end of the platform, wherein soil passes through the irradiation chamber after it exits the conveyer belt, (v) a soil analyzer bin, the soil analyzer bin being located on the upper surface of the platform proximal to the front end of the platform, a plurality of soil analyzers located within the soil analyzer bin, wherein soil passes through the soil analyzer bin after it exits the conveyer belt, (vi) a plurality of soil analyzers located within the soil analyzer bin, (vii) a microprocessor located within the soil analyzer bin, wherein the microprocessor analyzes various attributes and variables within the soil passing through the soil analyzer bin, (viii) a plurality of treatment chambers for treating soil passing through the device, said plurality of treatment chambers further comprising (1) a lime bin located on the upper surface of the platform, wherein the lime bin is designed to add an amount of lime to the soil, (2) a mulch bin located on the upper surface of the platform, wherein the mulch bin is designed to add an amount of mulch to the soil, (3) a germination bin located on the upper surface of the platform, wherein the germination bin is designed to add various seeds to the soil, (4) a microorganism bin located on the upper surface of the platform, wherein the microorganism bin is designed to add various microorganisms to the soil, (ix) a discharge chute, the discharge chute being attached to the upper surface of the platform proximal to the rear end of the platform, wherein soil traveling through the soil treatment device will pass through the discharge chute and be deposited on a ground surface, (x) means for depositing seeds in the vicinity of the discharge chute, said means further comprising (1) a plantar device overhanging the rear end of the platform, (2) an internal supply of seeds located within the plantar device, (3) wherein the plantar device, on an ongoing basis, deposits seeds into the just-deposited soil from the soil treatment device, (xi) means for intermixing the just-deposited seeds with the just-deposited soil, said means further comprising (1) a plurality of cutter knives attached to the plantar device, (2) wherein the plurality of cutter knives are dragged through the just-deposited soil on an ongoing basis, (d) a cab area located atop the irradiation chamber proximal to the front end of the platform, (e) a series of controls located within the cab area that allow an individual operate the soil treatment device, and (f) a generator to provide power to the series of controls, wherein the generator receives power from the internal combustion engine.

\* \* \* \* \*